(No Model.)

J. STONE & T. & B. A. WATSON.
COTTON OR CORN PLANTER.

No. 398,006.  Patented Feb. 19, 1889.

Witnesses.
A. Ruppert,
H. A. Daniels.

Inventors.
Josephus Stone
Thomas Watson
Branch A. Watson
Per
Thomas P. Simpson Atty

UNITED STATES PATENT OFFICE.

JOSEPHUS STONE, THOMAS WATSON, AND BRANCH ARCHER WATSON, OF BURTON, TEXAS.

COTTON OR CORN PLANTER.

SPECIFICATION forming part of Letters Patent No. 398,006, dated February 19, 1889.

Application filed September 29, 1888. Serial No. 286,730. (No model.)

*To all whom it may concern:*

Be it known that we, JOSEPHUS STONE, THOMAS WATSON, and BRANCH ARCHER WATSON, citizens of the United States of America, residing at Burton, in the county of Washington and State of Texas, have invented certain new and useful Improvements in a Cotton or Corn Planter; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to operate the seed-slide and agitator of a cotton-planter or other seeding device with the fewest mechanical parts and in the simplest manner.

Figure 1:
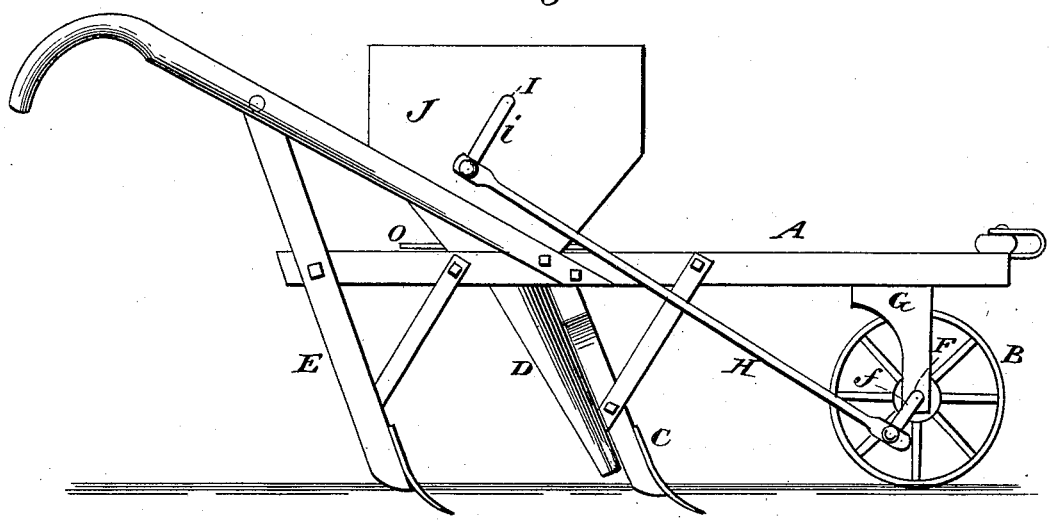
Figure 2:
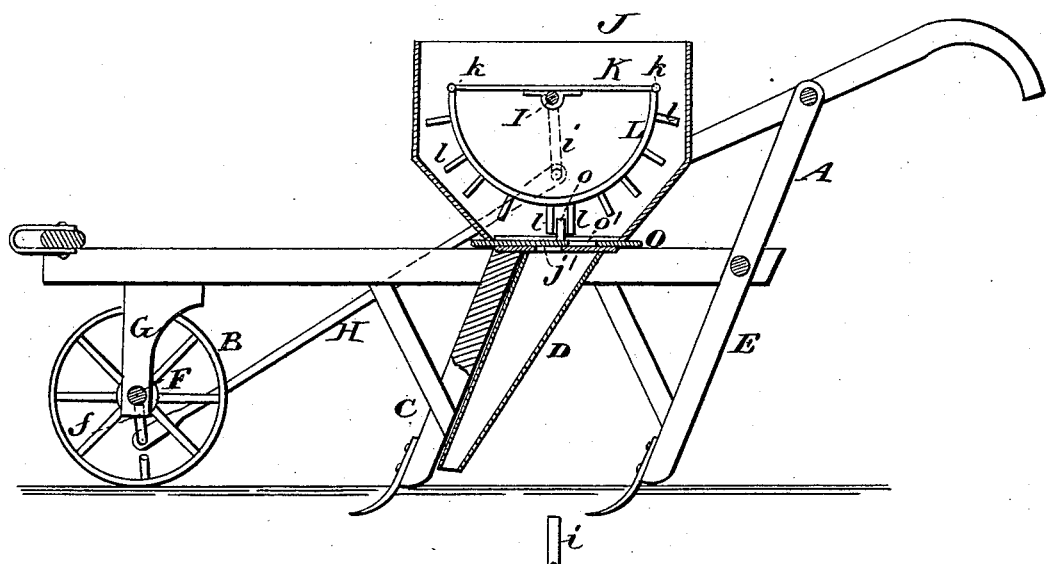
Figure 3:
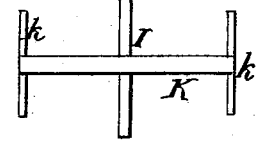

Figure 1 of the drawings is a side elevation of the planter; Fig. 2, a vertical longitudinal section thereof; and Fig. 3 is a plan view of the vibrating middle-pivoted stirrer-bar.

In the drawings, A represents the plow-frame; B, the front wheel, which runs on the ground; C, the plow for opening the seed-furrow; D, the discharge-tube for the seed, and E E the plows for covering the seed.

F is the wheel-shaft, which has its bearings in the hangers G G, and is provided with the crank $f$. The latter is connected by an end-pivoted pitman, H, with the crank-shaft I. The two cranks $i\ f$ are made to differ in length, so that the one $f$ will revolve, while the crank $i$ will vibrate in an arc of about thirty degrees, more or less. The shaft I has its bearings in the sides of the seed-hopper J, while on it we fasten the bar K rigidly at its middle and provide the ends with the transverse horizontal stirrers $k\ k$. The ends of bar K are also connected by a semicircular band, L, which has upon it the depending studs $l$ to stir the seeds in the plane of the discharge-holes.

O is the seed-slide, which has a vertical stud, $o$, against which work two of the band-studs $l\ l$, so as to move it back and forth. The seed-slide and the bottom of hopper J have corresponding holes, $o'\ j'$, which register at every other motion of the slide. The distance at which the droppings of the seed occur may be regulated by varying the diameter of the ground-wheel. Thus it will be seen that the agitator is made to operate the seed-slide and greatly simplify the working.

What we desire to protect by Letters Patent is—

In combination with the hopper of a corn or cotton planter, a vibrating sector, K L, provided with two median pins, $l\ l$, on the part L, and a seed-slide having the vertical stud $o$ projecting up between said pins, whereby the seed-slide will be intermittently and alternately struck by the two pins and reciprocated in opposite directions, as set forth.

In testimony whereof we affix our signatures in presence of two witnesses.

JOSEPHUS STONE.
THOS. WATSON.
BRANCH ARCHER WATSON.

Witnesses:
C. B. WATT,
J. H. STANLEY.